Aug. 14, 1945.   H. J. DE N. McCOLLUM   2,382,493
AIRCRAFT HEATING SYSTEM
Filed June 12, 1942
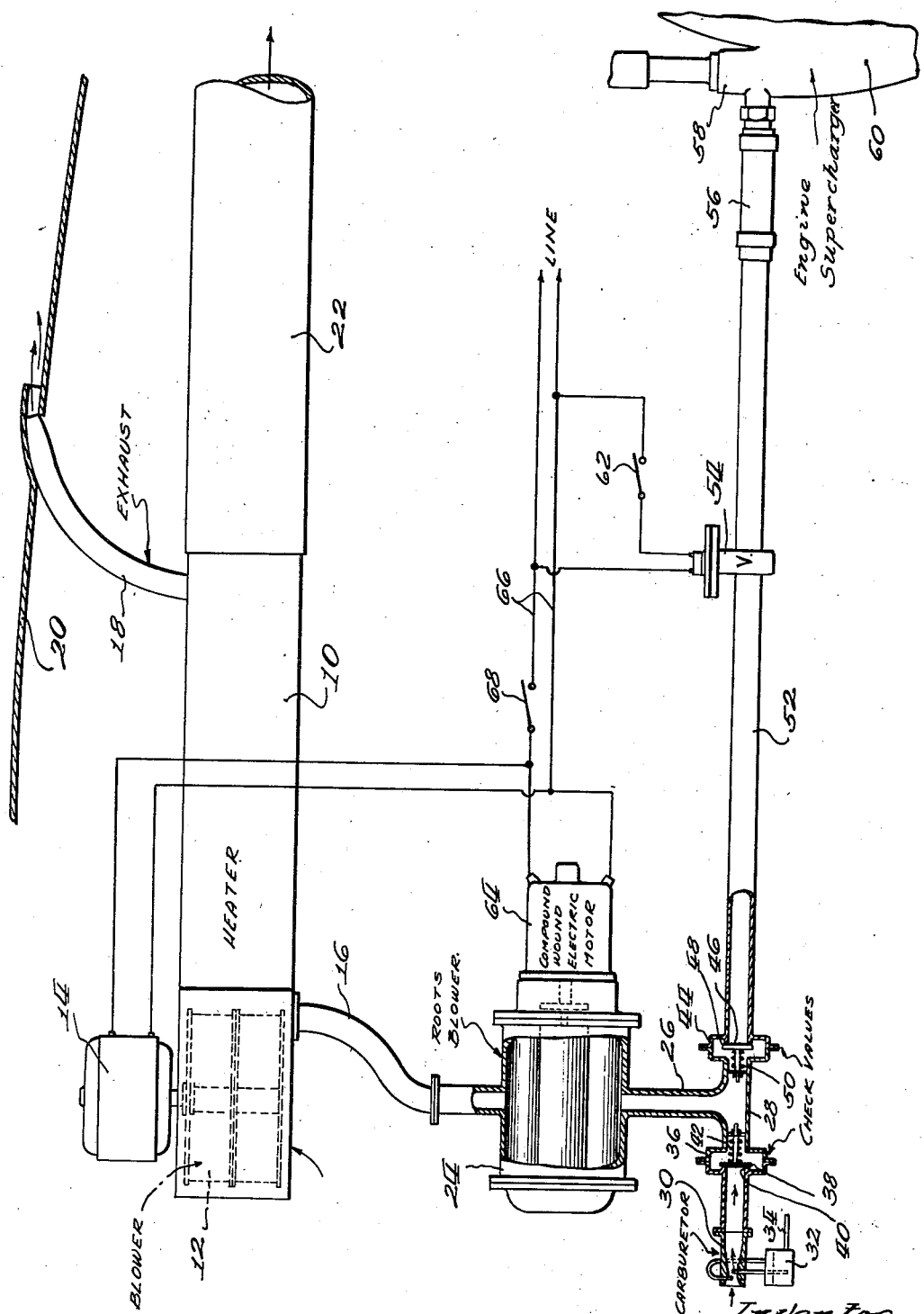
Inventor:
Henry J. DeN McCollum
By Williams, Bradbury & Hinkle
Attys.

UNITED STATES PATENT OFFICE 2,382,493

AIRCRAFT HEATING SYSTEM

Henry J. De N. McCollum, Chicago, Ill.; Thelma McCollum, executrix of said Henry J. De N. McCollum, deceased Application June 12, 1942, Serial No. 446,812

9 Claims. (Cl. 237—12.3)

My invention relates generally to heating systems, and more particularly to heating apparatus for aircraft employing a heater of the internal combustion type.

In order that the fuel mixture furnished to an internal combustion type heater used on aircraft shall be at sufficient pressure to burn satisfactorily, it has become common practice to withdraw from the outlet of the engine supercharger a sufficient quantity of the combustible mixture for supply to the heater. When the heater is provided with a combustible mixture supply system of this type, it is necessary that the aircraft supercharger, and hence, the engine, be in operation, in order that the heater may be used. This is disadvantageous in that it is frequently desired to use the heater while the airplane is on the ground and its main engines are not in operation.

To overcome the foregoing disadvantage and to make it possible to operate the heating system while the main airplane engines are not operating (or are idling at very low speed), I have provided an improved combustible mixture supplying apparatus for the heating system.

It is thus an object to provide an improved heating system employing an internal combustion type heater which is capable of operation irrespective of whether or not the airplane is in flight.

A further object is to provide an improved heating system for aircraft heaters, incorporating an internal combustion type heater in which the combustible mixture for the operation of the heater is provided either by an independent carbureting means or is withdrawn from the fuel mixture supplied by the engine supercharger, depending upon whether the pressure generated by the supercharger exceeds atmospheric pressure.

Other objects will appear from the following description, reference being had to the accompanying drawing, which diagrammatically illustrates a preferred embodiment of the invention.

This heater may be of any suitable construction, such, for example, as shown in my copending application Serial No. 378,262, filed February 10, 1941, and is provided with the usual ignition and thermostatic controls.

The heater 10 includes a heat exchanger, and the air to be heated is forced through the heat exchanger by a centrifugal blower 12 driven by a motor 14. The heater is supplied with a combustible mixture through a conduit 16, and the products of combustion from the heater are exhausted to the atmosphere through a conduit 18, which may extend through the fuselage wall 20 at a point where the pressure is reduced when the airplane is in flight. A conduit 22 conducts the heated air to the cabin or other space of the aircraft to be heated.

A positive displacement pump 24, which may be in the form of a Roots blower, has its outlet connected to the conduit 16, and has an inlet conduit 26, which terminates in a T 28.

When the aircraft is on the ground and its engines are not in operation, combustible mixture for the heater is furnished by a carburetor 30 having a balanced float bowl 32 connected to a suitable source of fuel by a conduit 34, the carburetor being connected to one arm of the T 28 through a check valve chamber 36 having a valve 38 normally urged toward its seat 40 by a light compression coil spring 42. The other arm of the T 28 is connected to a check valve chamber 44 containing a valve 46 normally held against its seat 48 by a light compression coil spring 50. A conduit 52, including a solenoid operated valve 54 and a flexible hose member 56 connects the check valve chamber 44 with the outlet 58 of an engine supercharger 60. The valve 54 is biased to closed position, but when the solenoid forming a part thereof is energized by closure of a switch 62, the valve is opened to permit flow of combustible mixture from the supercharger 60 to the check valve chamber 44.

The Roots blower 24 is driven by an electric motor 64, preferably a compound wound motor, which is connected to line conductors 66 upon closure of a switch 68. Closure of the switch 68 also connects the motor 14 to the line conductors 66.

When it is desired to operate the heating system while the airplane is on the ground, the switch 68 is closed and the controls of the heater 10 operated to cause starting thereof. Under these conditions, the Roots blower 24 will draw atmospheric air through the carburetor 30, and the resulting mixture will flow relatively freely past the check valve 38 to the inlet conduit 26 of the Roots blower and be discharged therefrom through the conduit 16 to the heater, where the combustible mixture will be ignited. Closure of the switch 68 will also result in energization of the motor 14 and cause the blower 12 to circulate the air to be heated past the heat exchanger of the heater to the cabin or other compartment to be heated. Under these conditions, the switch 62 will not be closed, and hence the valve 54 will remain closed to prevent fluid flow from the supercharger 60 to the check valve chamber 44.

When the airplane is in flight, the switch 62 is closed, either manually or as an incident to the operation of some other element of the aircraft, as, for example, when the landing gear is raised, and thereafter, the blower 24 will withdraw combustible mixture either from the supercharger 60 or through the carburetor 30 depending upon the pressure generated at the outlet of the supercharger as compared with atmospheric pressure.

The check valve springs 42 and 50 are preferably very light and equally compressible, and their valves 38 and 46 of equal effective area so that any slight difference in the pressures on the valve faces will result in one of the valves operating and the other valve closing.

During normal flight, the pressure developed by the supercharger 60 will usually greatly exceed the atmospheric pressure, so that the valve 46 will open and the valve 38 will close and the combustible mixture for the operation of the heater will be drawn substantially exclusively from the supercharger 60. However, under certain flight conditions, as when the plane is gliding to a landing, the pressure in the supercharger outlet 58 may be below atmospheric pressure, and under these circumstances, the valve 38 would open and the valve 46 would be closed, so that the fuel mixture for the heater would be supplied solely by the carburetor 30. Thus, whenever the switch 62 is closed, the blower 24 will withdraw the combustible mixture from whichever source is at the higher pressure and therefore the heating system will operate more efficiently, since the Roots blower 24 will be operating against a minimum pressure difference and the mixture supplied to the heater will be at a reasonably high pressure.

The motor 64, being preferably of a compound type, may be designed to maintain its speed of operation with increased load, and will thus tend to maintain the supply of combustible mixture to the heater relatively constant.

While I have shown and described a preferred embodiment of my invention, it will be apparent to those skilled in the art that numerous modifications and variations may be made without departing from the underlying principles of the invention. I therefore desire, by the following claims, to include within the scope of my invention all such modifications and variations by which substantially the results of my invention may be obtained by the use of substantially the same or equivalent means.

I claim:

1. In a heating system for aircraft equipped with an internal combustion engine and a supercharger operating independently of the heater for supplying combustible mixture to the engine, the combination of a heater of the internal combustion type, carbureting means for supplying a combustible mixture to said heater, a conduit connection from the engine supercharger to supply combustible mixture to said heater, and check valve means controlling the flow to said heater from said carburetor or from said supercharger, whichever is at the higher pressure, said check valve means being responsive solely to the relative pressures in said carburetor and the supercharger.

2. The combination set forth in claim 1 in which a positive displacement pump is provided to compress the fuel mixture supplied either by said carburetor or by said supercharger and force the mixture under pressure to said heater.

3. The combination set forth in claim 1 in which a shutoff valve is provided in the conduit means leading from the supercharger said shutoff valve being normally closed and being opened as an incident to the operation of the aircraft at a time when the supercharger is operating to increase the pressure at the outlet thereof above that of the atmosphere.

4. In a heating system for aircraft equipped with an internal combustion engine having a supercharger for supplying a combustible mixture thereto under superatmospheric pressure, the combination of a heater of the internal combustion type, a positive displacement pump having an inlet and having an outlet connected to said heater to supply a combustible mixture thereto, a carburetor connected to the inlet of said pump, conduit means connecting said supercharger to the inlet of said pump, and valve means controlling the flow to said pump, said means determining the flow to said pump from either said carburetor or said supercharger, whichever is at the higher pressure.

5. In a heating system for aircraft equipped with an internal combustion engine having a supercharger for supplying a combustible mixture thereto under superatmospheric pressure, the combination of a heater of the internal combustion type, a positive displacement pump having an inlet and having an outlet connected to said heater to supply a combustible mixture thereto, a carburetor connected to the inlet of said pump, conduit means connecting said supercharger to the inlet of said pump, and means responsive to the relative pressures of the combustible mixtures supplied by said carburetor and by said supercharger controlling the flow to said pump from said supercharger or from said carburetor, whereby the flow to said pump will be from said supercharger when the pressure of the fuel mixture supplied by said supercharger is greater than that of the fuel mixture supplied by said carburetor, and the flow to said pump will be from said carburetor when the pressure of the fuel mixture supplied by said carburetor is greater than that of the fuel mixture supplied by said supercharger.

6. In a heating system for aircraft equipped with an internal combustion engine and a supercharger operating independently of the heater for supplying a combustible mixture to said engine, the combination of an internal combustion type heater, carbureting means for supplying a combustible mixture to said heater, a connection for conveying combustible mixture from said supercharger to said heater, means responsive solely to the relative pressures in said carbureting means and said supercharger for cutting off the supply of fuel mixture from said carburetor or from said supercharger, depending upon which of the sources of combustible mixture is at the lower pressure.

7. In a heating system for aircraft equipped with an internal combustion engine and a supercharger operating independently of the heater for supplying combustible mixture to the engine, the combination of a heater of the internal combustion type, having an outlet, a conduit connecting said outlet to a space at subatmospheric pressure, carbureting means receiving air from the atmosphere and supplying combustible mixture to said heater, a conduit connection from the engine supercharger to supply combustible mixture to said heater, and means selectively controlling the flow to said heater from said carbureting means or the supercharger, whichever is at the higher pressure, said means being responsive solely to the relative pressures in said carbureting means and the supercharger.

8. The combination set forth in claim 7 in which a positive displacement pump is provided to compress the fuel mixture supplied either by said carburetor or by said supercharger and force the mixture under pressure to said heater.

9. The combination set forth in claim 7 in which an electromagnetically operated shutoff valve is provided in the conduit connection leading from the supercharger, said shutoff valve being normally closed and being opened as an incident to the operation of the aircraft at a time when the supercharger is effective to increase the pressure at the outlet thereof above that of the atmosphere.

HENRY J. DE N. McCOLLUM.